United States Patent [19]

Bruton et al.

[11] 4,354,425
[45] Oct. 19, 1982

[54] FIRE-SAFE VALVE ACTUATOR

[75] Inventors: Billy R. Bruton; Jerome E. Corneillie, both of Longview; Marion W. Perkins, White Oak, all of Tex.

[73] Assignee: U.S. Industries, Inc., New York, N.Y.

[21] Appl. No.: 148,385

[22] Filed: May 9, 1980

[51] Int. Cl.³ .......................... F01B 19/00; F16J 3/00; F01B 29/00
[52] U.S. Cl. ........................................ 92/94; 92/128; 92/129; 92/13; 251/61.4; 137/377
[58] Field of Search ............... 92/130 R, 116, 94, 128, 92/129; 251/61.4, 63.6; 137/377

[56] References Cited

U.S. PATENT DOCUMENTS

| | | | |
|---|---|---|---|
| 1,123,864 | 1/1915 | Fulton | 92/130 R |
| 2,203,243 | 6/1940 | Wettstein | 92/130 R |
| 2,437,552 | 3/1948 | Ouiroz | 251/61.4 |
| 2,675,204 | 4/1954 | Johnson | 92/94 |
| 3,052,444 | 9/1962 | Kinter | 92/130 R |
| 3,122,065 | 2/1964 | Loun | 92/130 R |
| 3,375,760 | 4/1968 | Taplin | 92/130 R |

Primary Examiner—Paul E. Maslousky

[57] ABSTRACT

A fire-safe valve actuator which cooperates with a bolted bonnet type valve to define a bolt chamber with an exterior shroud supporting the actuator housing and providing a substantially imperfect barrier to prevent an external fire from coming into direct contact with the bolts or studs and nuts that connect the bonnet to the valve body. The bolt chamber may also be filled with an insulation material. The actuator may have a return spring connected to the actuator stem through a bearing so that the winding and unwinding of the spring does not result in any substantial torque being applied to the actuator stem. Similarly, any diaphragm in the actuator can be connected to the actuator stem by a bearing so that rotation of the stem will not impart torque to the diaphragm. Furthermore, a stop can be provided limiting outward movement of the stem under the influence of the spring and by further providing a suitable sliding engagement between the diaphragm-actuator housing and the stem, the actuator housing and diaphragm can be readily removed from the balance of the actuator without bleeding the line pressure down.

12 Claims, 5 Drawing Figures

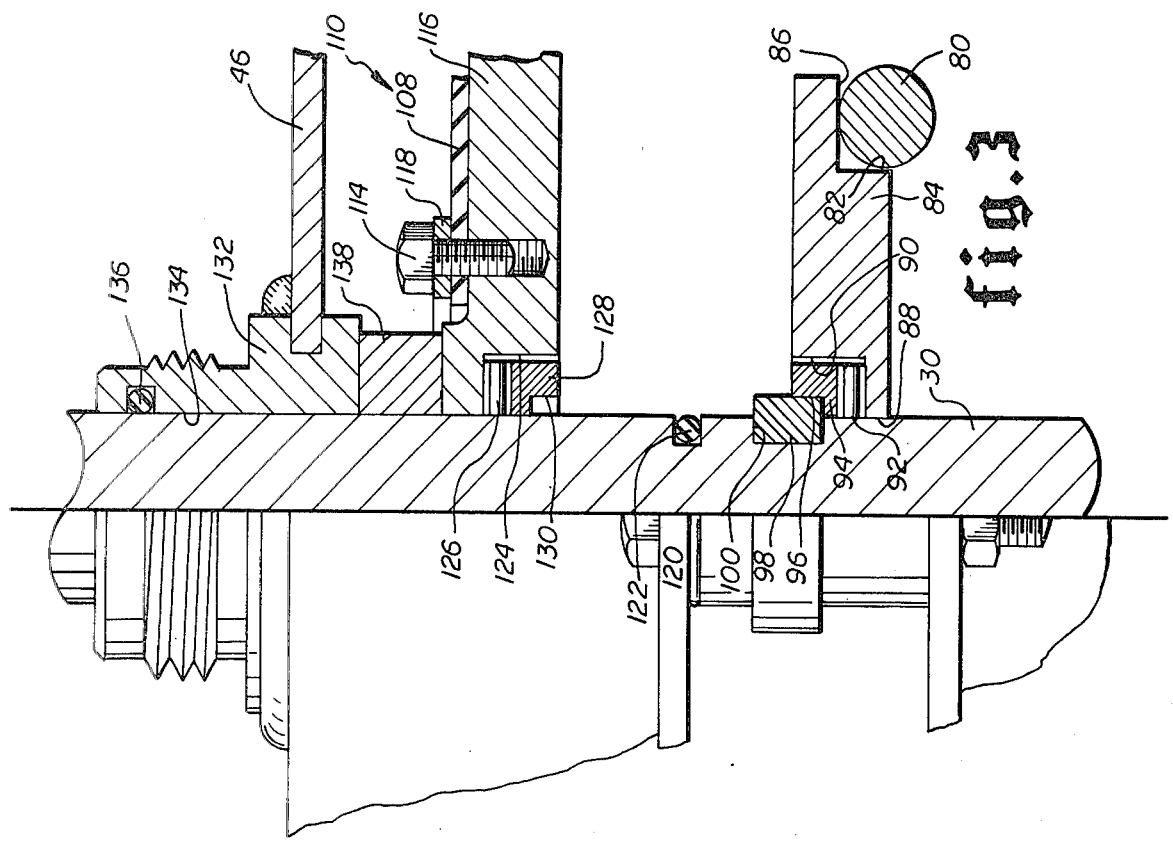
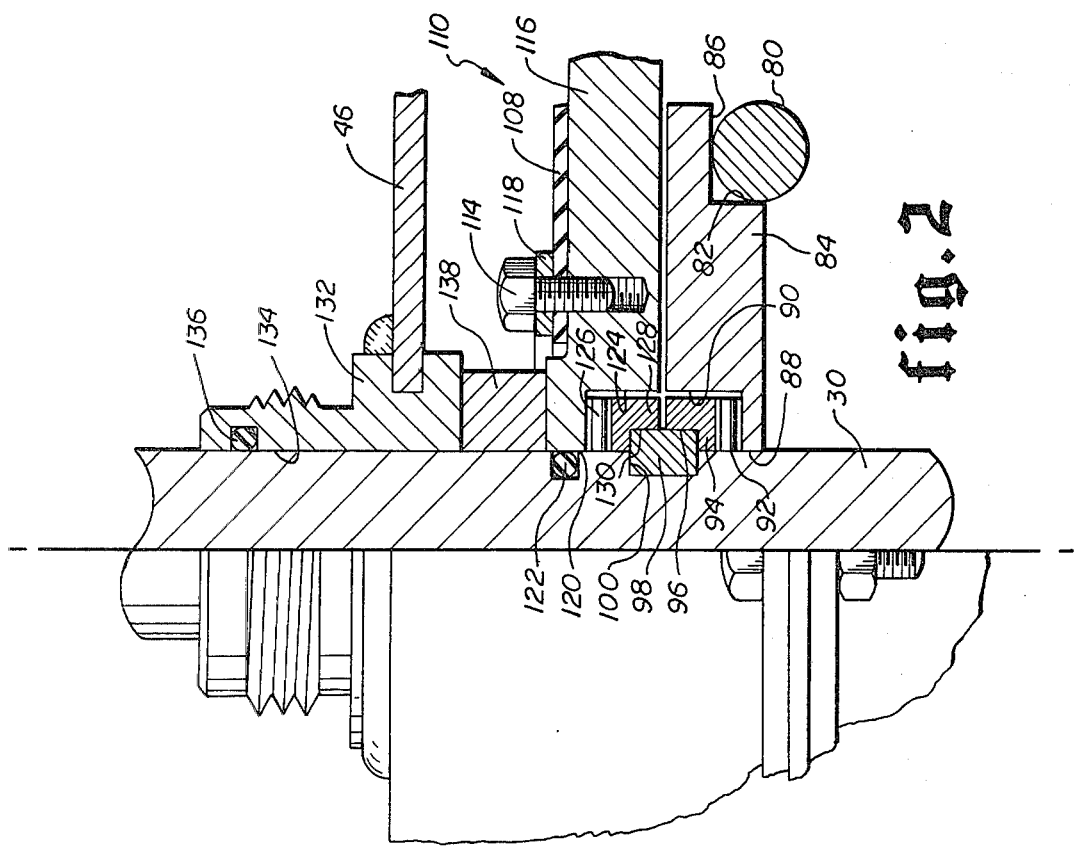

FIRE-SAFE VALVE ACTUATOR

FIELD OF THE INVENTION

This invention relates generally to valve actuator systems and, more particularly, concerns a valve actuator that is capable of providing protection for the bonnet structure of a valve during conditions of extreme heat, such as by external fires, thereby preventing heat induced deterioration of the pressure containing integrity of the valve mechanism for extended periods of time. Even more specifically, the present invention relates to a valve actuator mechanism that may be simply and efficiently repaired or replaced while the valve serviced thereby is allowed to be maintained under pressure during removal of the actuator from the valve mechanism.

BACKGROUND OF THE INVENTION

When the bonnet structure of a conventional high pressure gate valve is assembled to the valve body, the bolts or studs and nuts that interconnect the body and bonnet structures are typically stressed quite highly in order to prevent leakage at the bonnet joint during periods when the valve is pressurized to its maximum operating pressure. Moreover, when the valve body is pressurized, these studs and nuts and bolts are subjected to considerable stress due to pressure acting on the seal area of the bonnet-to-body connection. In the event of a severe fire in close proximity to the valve and actuator mechanism, the studs and nuts or bolts that secure the bonnet to the valve body will become heated quite rapidly. In many cases, valve failure occurs during the excessive heat of direct flame impingement because the studs and nuts become heated to a temperature that reduces the strength thereof to the failure point. In many cases, it is desirable that valves be designed to remain safe and operative for extended periods of time even under circumstances where direct flame impingement causes rapid heating thereof. It is desirable, therefore, to prolong the time required for the studs and nuts of a bonnet-to-body connection to reach a temperature that reduces the strength of the studs and nuts to a level where failure occurs and the bonnet seal is lost. By prolonging the typical failure time of conventional valves, it is possible for the external fire to be extinguished before any high pressure valves can become heated to the point that stud and nut failure occurs. Obviously, in the case of combustible materials, such as petroleum products, it is highly desirable that fire induced valve failure be retarded in order to prevent the high pressure petroleum products from leaking from the bonnet connection and feeding the fire.

Another typical cause of valve failure induced by the heat of external fires is the failure of the stem packing structure of the valve which ordinarily prevents internal valve pressure from escaping from the valve stem opening of the bonnet. Under circumstances of excessive heat, typical stem packing materials deteriorate quite rapidly and tend to allow stem leakage. It is desirable, therefore, to provide a valve and valve actuator mechanism having the capability of retarding transfer of the heat of an external fire to the valve stem packing and thereby retard any valve stem leakage that might otherwise occur. It is also desirable to provide the packing structure of the valve with means to promote introduction of a combination lubricant and sealant material by way of an exposed lubrication fitting even though the valve and valve actuator mechanism may be designed for retarding transfer of heat to the bonnet structure of the valve.

In many cases, pneumatic valve actuators are employed incorporating spring return features that induce mechanical movement of a valve stem to a predetermined position in opposition to the direction of movement induced by a pneumatic diaphragm controlled system. One of the problems with spring return of pneumatic diaphragms, however, is the degree of rotary force to which the diaphragm is often subjected as the compression spring winds and unwinds during compression and extension thereof during linear movment of the valve stem. In many cases it is also desirable to prevent introduction of rotational forces to the valve stem as well. It is desirable, therefore, to provide a valve actuator mechanism incorporating means to protect the diaphragm of the pneumatic actuator from spring-induced rotational forces during actuation thereof.

In some types of diaphragm type actuators, an actuator stem is threaded to the valve stem so that upon rotation of the actuator stem (e.g., manually), the valve stem is moved axially to open or close the valve. In such instances, it is desirable to minimize the torque applied to the diaphragm by the rotating actuator stem.

One of the serious disadvantages of pneumatic actuators, as well as many other types of valve actuators, is the inability of the valve actuators to be repaired and/or replaced while the valve associated therewith remains under pressure. Under circumstances where it is simply necessary to replace the diaphragm of a diaphragm type pneumatic actuator, it is frequently necessary to shut down the entire production line and deplete the pressure of the valve controlled by the actuator before the actuator can be disassembled for replacement or repair. It is desirable, therefore, to provide a pneumatic valve actuator mechanism that may be simply and efficiently removed for replacement or repair without necessitating complete shutdown and depressurization of the flow system that is controlled by the valve.

SUMMARY OF THE INVENTION

It is therefore a feature of the present invention to provide a novel valve actuator system that has the capability of providing a bolted bonnet type valve mechanism with protection against deterioration of the bolt and studs thereof by direct impingement of external fires on the valve and actuator assembly.

It is also a feature of this invention to provide a novel valve and actuator assembly wherein the stud and nut bonnet connection structures of the valve are encapsulated within a protective chamber and are insulated in order to retard transfer of the heat of external fires to the studs and nuts of the valve bonnet assembly.

It is an even further feature of this invention to provide a novel valve and actuator assembly wherein the stem seal structure of the valve mechanism is efficiently protected against the heat of external fires in order to retard transfer of heat to the stem packing structure of the bonnet and therefore retard the development of any heat induced stem leakage that might otherwise occur.

Among the several features of this invention is contemplated the provision of a novel pneumatic valve actuator mechanism that incorporates means to prevent transfer of rotary spring induced force to the diaphragm of the valve actuator and thereby prevent diaphragm deterioration that might otherwise be induced by winding and unwinding of the compression spring as it collapses and extends during linear movement of the valve stem.

It is also an important feature of this invention to provide a novel valve actuator mechanism that may be simply and efficiently removed from a valve and bonnet assembly while at the same time allowing the valve mechanism to be maintained under pressure and in safe condition.

In accordance with another feature of this invention, provision is made for efficient introduction of sealant material into the valve packing assembly even though the bonnet structure of the valve is encapsulated for the purpose of fire protection.

The present invention is directed to the provision of a pneumatic valve actuator for a valve wherein the primary force for causing the valve stem to move outwardly is developed by line pressure in the valve acting in the cross-sectional area of the stem. A compression spring is also provided to apply a secondary force to the stem to assure its outward movement when line pressure is low or absent. The stem is moved inwardly by pressure applied to a diaphragm connected to the stem. The compression spring bears against a spring plate that is interconnected with the valve stem by means of a bearing structure. The bearing structure reduces or eliminates torque from being applied to the stem and hence possibly to the diaphragm by winding and unwinding of the spring as it compresses and extends.

A diaphragm element is secured to a diaphragm plate that is also interconnected with the valve stem by means of a bearing structure. Rotational movement induced by rotating the stem is preventing from being transmitted to the diaphragm plate by the bearing mechanism. Thus, the diaphragm and valve stem are not subjected to rotational stresses as the actuator mechanism imparts operative movement to the valve stem in either direction thereof.

The unique relationship of the spring plate and diaphragm plate to the valve stem allows the actuator mechanism, with exception of the compression spring and spring plate assembly, to be simply and efficiently removed from the valve for repair or replacement. Removal of the actuator housing is accomplished simply by removing a minimum number of connection bolts that secure the actuator housing to the bonnet structure and by simply moving the actuator housing away from the valve to cause the desired separation. When the valve actuator is removed, the spring and spring plate remain in assembly with the valve stem. The compression return spring, therefore, continuously energizes the valve stem through the spring plate and maintains the valve stem at an outwardly extended position. This outwardly extended position of the valve stem may be a safe "open" or safe "closed" position, depending upon the location of the port in the gate. In most cases, however, the safe position of the valve is the closed position.

Under circumstances where the valve must be placed back on stream as rapidly as possible, a replacement actuator may be provided and may be simply and efficiently installed simply by moving the housing thereof onto the valve stem and bringing the diaphragm plate and bearing assembly into engagement with an appropriate shoulder defined on the valve stem. The replacement actuator may be simply bolted into assembly with the valve bonnet structure and the appropriate pneumatic connections may be made to complete the installation operation. The valve bonnet is formed to define an annular actuator support flange that is positioned in spaced relation with a typical bonnet flange that is designed for attachment to a valve body by means of studs and nuts. The actuator housing is formed to define an elongated connection portion or shroud that encircles the actuator connection flange and the bonnet flange. The actuator shroud cooperates with the bonnet structure to define an annular protective chamber within which the studs and nuts are located. This protective chamber may also be filled with a fire retardant heat insulation material that assists in protecting the studs and nuts from transfer of heat. Thus, the studs and nuts of the bonnet structure are protected against direct impingement by the flame and heat of a fire externally of the valve and actuator assembly. The actuator mechanism also protects the bonnet structure of the valve from corrosion in the event the valve is employed in a corrosive environment.

The actuator connection flange is formed to define a sealant passage and a sealant fitting is assembled to the bonnet structure to allow injection of sealant material into the packing chamber of the bonnet to enhance the sealing capability of the stem packing. By forming a sealant injection aperture in the stroud of the actuator housing, sealant material may be injected into the packing chamber at any time without necessitating removal of the valve actuator from the bonnet structure.

BRIEF DESCRIPTION OF THE DRAWINGS

In order that the manner in which the above recited advantages and features of the invention are attained and can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of this invention and therefore are not to be considered limiting of its scope, for the invention may admit to other equally effective embodiments.

IN THE DRAWINGS

Figure 1:
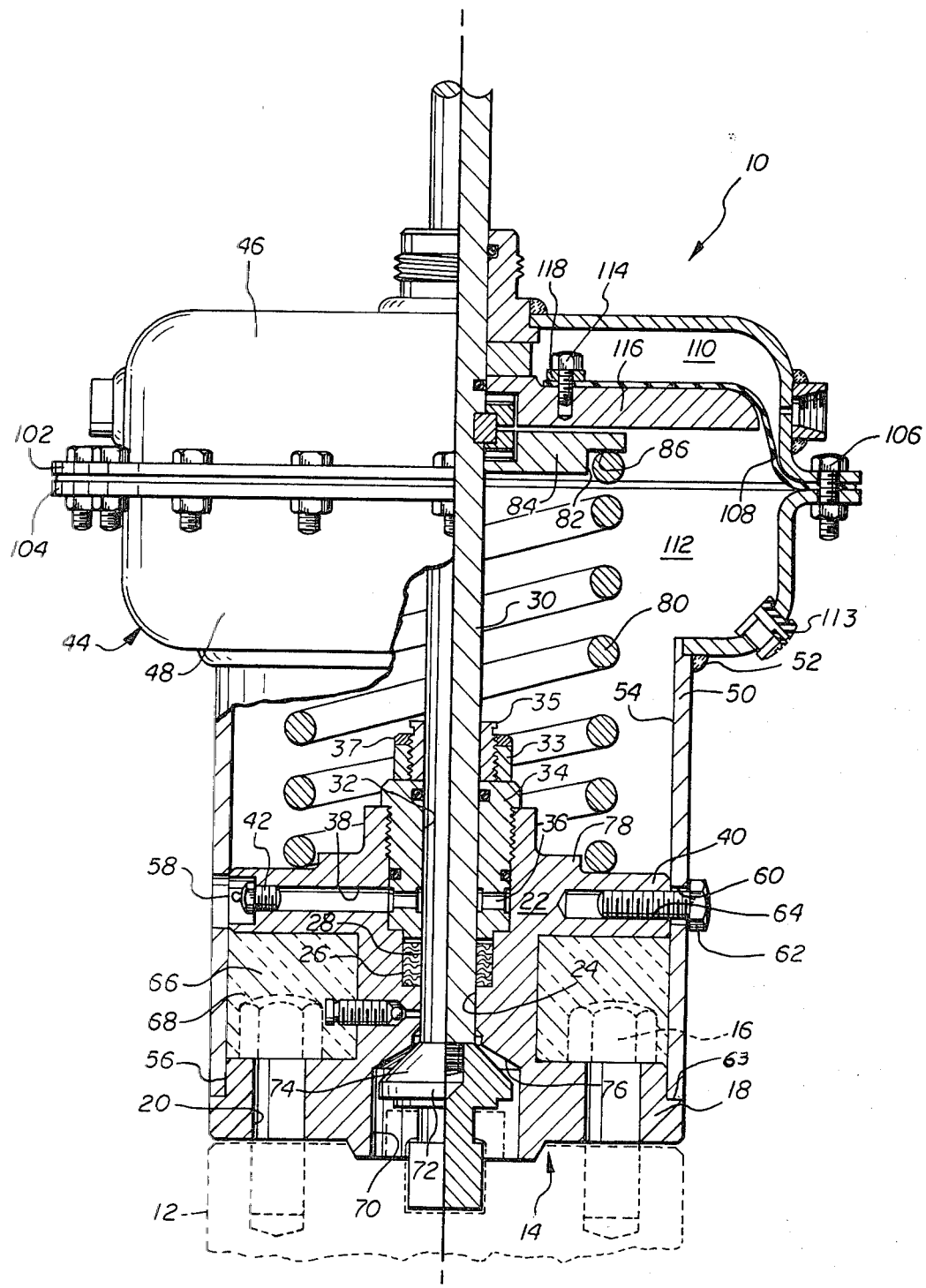

FIG. 1 is an elevational view of a pneumatic valve actuator constructed in accordance with the present invention with a major portion thereof broken away and illustrated in section and with a view to which the actuator is connected partially illustrated in broken line.

FIG. 2 is an enlarged fragmentary sectional view of the valve actuator mechanism of FIG. 1, illustrating the relationship of the spring plate and the diaphragm plate to the valve stem.

FIG. 3 is a sectional view similar to FIG. 2 and illustrating the actuator housing and diaphragm assembly being moved upwardly during separation thereof for repair or replacement.

Figure 4:
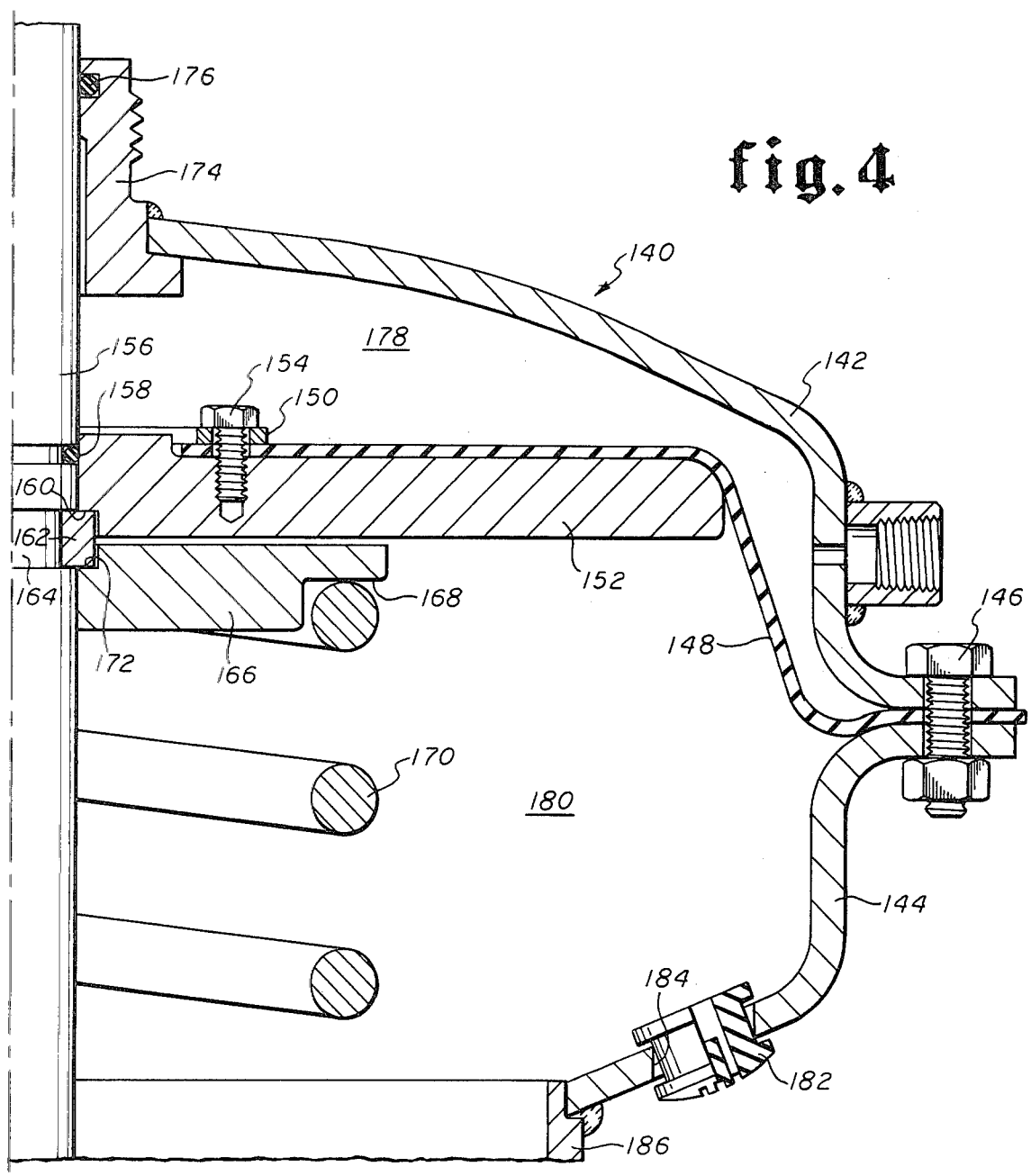

FIG. 4 is a partial sectional view of a valve actuator mechanism representing a modified embodiment of this invention.

Figure 5:
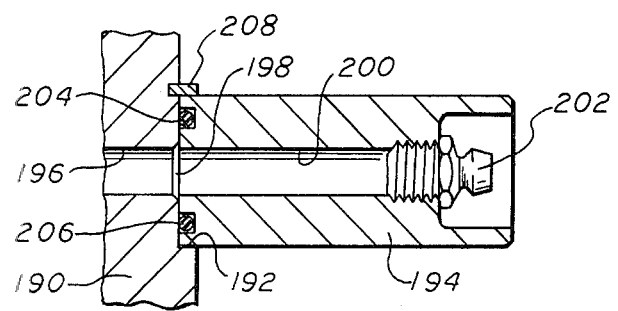

FIG. 5 is a fragmentary sectional view of a valve actuator mechanism representing a further modified embodiment of this invention.

DETAILED DESCRIPTION OF THE PREFERRED EMBODIMENT

The present invention is discussed herein and illustrated in the drawings particularly in regard to pneumatic type valve actuators. It is to be understood, however that the invention applies effectively to any type of valve actuator mechanism, such as hydraulic operators, electrical operators, or manual operators, without limiting the scope of the invention in any manner whatever.

Referring now to the drawings and first to FIG. 1, there is illustrated a valve actuator mechanism generally at 10 which is of pneumatically energized character and which is adapted to be interconnected with the bonnet portion of a valve such as a gate valve, for example, which is partially illustrated in broken line at 12. The valve mechanism incorporates a valve body and a bonnet structure illustrated generally at 14 is secured to the body by means of a plurality of stud and nut assemblies such as are illustrated in broken line at 16. The valve actuator mechanism is related integrally with the bonnet structure of the valve and is entirely supported by the valve bonnet structure as will be evident from the following. The bonnet structure incorporates a bonnet flange 18 defining a plurality of bolt holes 20 through which the studs extend for threaded assembly within appropriate apertures formed in the valve body.

The bonnet structure also incorporates an intermediate section 22 through which a stem passage 24 is formed and with an enlarged portion 26 of the stem passage defining a packing chamber within which is received a packing 28. A valve stem 30 extends through the stem passage 24, packing 28, and a stem passage 32 defined in a packing retainer element 34 that is threadedly retained within the upper portion of the bonnet structure. It is intended that the present invention be equally adaptable to manual override type actuator systems as well as actuator systems incorporating integral valve stems as shown in the drawings. In many systems of manual override, the stem will be threaded internally to receive a threaded member which is connected to the gate. The threaded member will be contained within the stem such that line pressure does not act on any cross-section of the threaded member, creating what is generally known as a "balanced stem" manual override.

The packing retainer element 34 is also formed to define a lubricant chamber 36 that is disposed in registry with a lubricant passage 38 through which lubricant material is injected into the lubricant chamber. The sealant passage is formed within an actuator connection flange 40 that is formed integrally with the bonnet structure and is positioned in spaced relation with the bonnet flange 18. A lubricant supply fitting 42 is threadedly received by the actuator connection flange at the outermost portion of the lubricant passage 38, thus providing means by which lubricant material may be readily injected through passage 38 into the lubricant chamber 36. In the event the packing 28 should begin to leak, the leaked fluid will be vented by the fitting 42, thus preventing any buildup of pressure between the stem packing and the O-ring seals of the packing retainer 34. The fitting thus provides a "tattle-tale" feature to ensure that any packing leakage is noticed and corrected.

To provide an adjustable stop for limiting downward travel of the valve stem and gate, a stop body 33 is provided about the valve stem which is supported by the packing retainer 34. An externally threaded stop sleeve 35 is vertically adjustable relative to the internal threads of the stop body 33 and is locked in place by a lock nut 37. The spring plate 84 engages the stop sleeve at the desired limit of downward travel thereof and thus achieves proper positioning of the gate relative to the flow passage and seats of the valve.

An mentioned above, when the stud and nut assemblies of typical bolted bonnet valves are subjected to direct heat from an external fire, the stud and nut assemblies can become rapidly heated to the point that the yield strength of the material from which the studs and nuts are composed becomes drastically reduced. Under circumstances where the valve is subjected to high pressure, heat induced deterioration of the structural integrity of the stud and nut assemblies can cause sufficient yielding to allow the bonnet connection with the valve body to lose its sealing contact with the valve body, thereby allowing valve leakage. If the product controlled by the valve is of flammable nature, of course, valve leakage is highly undesirable since the product leaking from the valve would, in effect, be feeding the fire. It is desirable, therefore, to provide valve actuator mechanism that retards heating of the stud and nut assemblies and thereby materially prevents stud and nut failure and bonnet leakage as compared to conventional valve constructions.

In accordance with the present invention, a valve actuator housing is illustrated generally at 44 and incorporates upper and lower housing sections 46 and 48, respectively. An actuator connection shroud 50 is interconnected with the lower housing section 48 by means of an annular weld as shown at 52. The actuator connection shroud 50 is of generally cylindrical form, defining an internal cylindrical surface 54 that is received in close fitting relation by external cylindrical surfaces 56 and 58 that are defined respectively by the bonnet flange 18 and the actuator connection flange 40. A plurality of connection apertures 60 is formed in the shroud 50, and connection bolts 62 are extended through the apertures 60 and are received by threaded bolt apertures 64. The bolts 62 secure the shroud 50 and thus the actuator housing 44 in assembly with the actuator connection flange 40. The bonnet flange 18 is formed to define an annular shoulder 63 against which the lower extremity of the shroud 50 rests, thus properly positioning apertures 60 with respect to bolt apertures 62 of connection flange 40. Since the lower portion of the cylindrical surface 54 bears against the cylindrical surface 56 defined by the bonnet flange 18, the bonnet flange provides abutting and stabilizing support for the actuator shroud and thus lends significant structural integrity to the valve actuator housing. It should be noted that the actuator housing structure may also be of unitary nature, such as is the case where this invention is incorporated in conjunction with hydraulic actuator systems. It is not intended to limit this invention to pneumatic valve actuator systems such as shown and described, it being apparent from this disclosure that the invention finds application in a wide range of valve actuator systems.

The actuator shroud 50 cooperates with the spaced flanges 18 and 40 to define an annular protective chamber 66 within which the upper portions of each of the studs and the various nuts of the stud and nut assemblies are located. If desired, the protective chamber 66 may be filled with air which, of course, is a poor conductor of heat. In the alternative, in the event additional heat insulation quality is desired within the protective chamber 66, a quantity of heat insulation material 68 may fill the protective chamber 66, thus providing further heat retarding characteristics and allowing the stud and nut assemblies 16 to be not only free of direct flame impingement, but also protected from rapid transfer of heat through the housing structure. The shroud also protects the bonnet structure, including the stud and nut assemblies thereof from corrosion in the event the valve and actuator assembly are located in a corrosive environment.

The lower central portion of the bonnet structure is formed to define a bore 70 within which an enlarged head portion 72 of the valve stem 30 is received. The head portion 72 of the valve stem is formed to define a frustoconical surface 74 that is adapted to engage a frustoconical surface 76 of differing angular relationship at the uppermost position of the valve stem 30. These interacting frusto-conical surfaces effectively promote the development of a metal-to-metal seal that assists in preventing stem leakage under circumstances where the valve stem is moved to its position of maximum outward limit.

The upper portion of the actuator connection flange 40 is formed to define an annular spring positioning shoulder 78 about which is positioned the lower extremity of a compression spring 80 that bears against the upper surface of actuator connection flange 40. The upper portion of the compression spring 80 is received about a spring positioning shoulder 82 that is defined by a spring retainer plate 84 and with the spring actually bearing against an annular abutment surface 86 defined at the outer periphery of the spring retainer plate.

With reference specifically to FIG. 2, the spring plate also is formed to define a central opening 88 through which the valve stem 30 extends and defines a bearing receptacle 90 within which is received a thrust bearing assembly 92 with an upper thrust element 94 thereof defining a recess 96 within which is adapted to be received the lower portion of a thrust ring 98 such as a retainer ring that is received within an annular groove 100 formed in the valve stem 30. As the compression spring 80 bears upwardly against the spring plate 84, the force of the compression spring is transferred through the bearing assembly 92 to the thrust ring 98 and thence to the valve stem 30. The upwardly directed force of the compression spring therefore is transmitted to the valve stem tending to move it outwardly away from the valve body. In absence of any opposing force, the return spring 80 will maintain the valve stem 30 at the outermost safe position thereof, maintaining metal-to-metal seal between the valve stem and bonnet by virtue of the interacting frusto-conical surfaces 74 and 76. Thus, line pressure will act on the area of the metal-to-metal seal to exert a sealing force proportional to the magnitude of the flow line pressure.

As the return spring is compressed and extends during actuation and return of the valve stem during valve operation, the spring winds and unwinds and thus imparts rotational forces against the abutment surfaces supporting the upper and lower extremities thereof. By virtue of the thrust bearing 92, rotational forces applied against abutment surface 86 simply cause rotation of the spring plate 84. The thrust bearing assembly effectively protects the valve stem 30 from being subjected to rotational forces due to winding and unwinding of the compression spring during operational sequencing.

The upper and lower housing sections 46 and 48 define connection flanges 102 and 104 that are each formed to define a plurality of apertures through which a plurality of bolts 106 extends for the purpose of securing the upper and lower housing sections in assembly. The bolts 106 also extend through a plurality of apertures defined in an outer peripheral portion of a diaphragm 108 that separates the actuator housing into an upper pneumatic energizing chamber 110 and a lower spring return chamber 112. The spring return chamber is vented to the atmosphere via a vent plug 113 to compensate for volumetric change in the spring return chamber 112 as the diaphragm 108 is moved. In the event of a sudden pressure increase in the chamber 112, the vent plug 113, being composed of an elastomeric yieldable material, will blow out of the vent plug opening, thus providing greater venting capability to prevent rupture of the housing. The inner peripheral portion of the diaphragm 108 is interconnected by means of a plurality of bolts 114 to a diaphragm plate 116. A diaphragm retainer ring 118 through which the bolts 114 extend establishes sufficient compression of the inner peripheral portion of the diaphragm against the diaphragm plate so as to develop a positive gas tight seal therewith. The central portion of the diaphragm plate 116 is formed to define an aperture 120 through which the valve stem 30 extends. An annular sealing element such as an O-ring 122 or the like is positioned within an annular seal groove formed in the valve stem and maintains a positive seal between the valve stem and diaphragm plate. The diaphragm plate is also formed at the inner portion thereof to define a bearing receptacle 124 within which is received a bearing assembly 126 having a circular thrust element 128. The thrust element 128 defines a thrust receptacle 130 that is adapted to receive the upper portion of the thrust ring 98. Thus, downward force induced by the diaphragm 108 to the diaphragm plate 116 responsive to increase in gas pressure within the pneumatic pressure chamber 110 causes the diaphragm plate 116 to apply a downward force to the thrust bearing assembly 126. This downwardly directed force is transferred through the thrust bearing assembly and thrust element 128 to the thrust ring 98, thus causing transfer of downwardly directed force to the valve stem 30. The downwardly directed force, therefore, acts against the inherent force of the compression spring 80, compressing the spring and shifting the valve stem downwardly to the desired position.

The bearing assemblies in both the spring plate and diaphragm plate are beneficial in cases where a manual override of the type previously mentioned is incorporated. The manual override is accomplished by rotation of the valve stem causing the threaded member connected to the gate to move upwardly or downwardly. These bearings thus prevent the torque imparted by rotation of the valve stem from transferring to the diaphragm plate or spring plate.

At the upper central portion of the upper housing section 46 is connected a stem fitting 132 that is formed to define a stem passage 134 through which the upper portion of the valve stem 30 extends. An annular sealing element 136 such as an O-ring or the like is maintained within an internal groove formed in the fitting 132 and is operative to maintain a positive seal with the valve stem 30. A stop ring 138 is positioned about the valve stem 30 within the pressure chamber 110 and is operative to limit upward movement of the diaphragm plate 116 under the force induced by the compression spring 80. The stop ring 138 is of sufficient thickness to cause accurate positioning of the flow port of the gate that is controlled by the valve stem 30.

When it is desirable to remove the valve actuator mechanism from the valve for the purpose of repair such as replacement of a diaphragm, for example, the disassembly procedure is simple and efficient. The actuator connection bolts 62 are removed after which the actuator housing assembly, including the upper and lower housing sections and the shroud portion 50, is simply moved outwardly as indicated in FIG. 3 until the actuator housing has been completely withdrawn from the valve stem 30. The compression spring and spring retainer plate 84 will remain in the position illustrated in FIGS. 1 and 2, thus ensuring that the valve stem 30 is continuously maintained to its outermost safe position during removal and replacement of the valve actuator mechanism. After the valve actuator has been repaired, it may be assembled to the valve and bonnet structure about the compression spring and spring retainer plate assemblies simply by reversing the procedure and inserting the valve stem 30 through the aperture 134 of the actuator fitting 132. The actuator is simply moved toward the valve and bonnet structure sufficiently to cause the thrust ring 98 to be appropriately seated within the recess 130 of the thrust element 128. When this is accomplished, the apertures 60 of the actuator shroud 50 will be registered with the bolt holes 64 and the bolts 62 may simply be threaded in place and tightened after which the assembly procedure is complete. The fluid connections may then be established between the pneumatic supply and bleed conduits that communicate with the pneumatic pressure chamber 110.

Under circumstances where it is desirable that the valve be placed back in service as rapidly as possible, a replacement actuator may be installed in place of an actuator that is removed for repair simply by following the actuator assembly procedure identified hereinabove. It is possible to remove and replace a pneumatic actuator within a few minutes time through the use of ordinary tools.

Under circumstances where a degree of frictional contact between the compression spring, spring plate and thrust ring may be tolerated without adverse effect, the valve actuator mechanism may conveniently take the form illustrated generally at 140 in FIG. 4 where a valve actuator incorporates upper and lower housing section 142 and 144, respectively, which are secured in assembly by bolts and nuts 146. The outer peripheral portion of a flexible diaphragm 148 is secured between the housing sections by the bolts and nuts 146 while the inner peripheral portion of the diaphragm is secured by a retainer ring 150 that is maintained in sealed assembly with a diaphragm plate 152 by a plurality of bolts 154. The inner periphery of the diaphragm plate is fitted closely with the valve stem 156 and is sealed with respect to the valve stem by a sealing element 158, such as an O-ring or the like, maintained within a seal groove. The diaphragm plate 152 is also formed at the inner peripheral portion thereof to define an annular thrust receptacle 160 that is adapted to receive a thrust ring 162 that is supported within an appropriate groove 164 formed in the valve stem.

A spring retainer plate 166 defines an annular shoulder 168 that receives the upper extremity of the actuator compression spring 170. The inner peripheral portion of the spring retainer plate receives the valve stem and is formed to define an annular receptacle 172 that receives the thrust ring 162. The diaphragm plate is readily moved linearly along with the actuator housing assembly to accomplish removal of the actuator housing in the same manner as described above in connection with FIGS. 2 and 3.

The upper housing section 142 incorporates a stem seal fitting 174 having suitable sealing element 176 that establishes a sealed relation between the stem seal fitting and the valve stem and thereby prevents leakage of the pneumatic medium from the pressure chamber 178 of the actuator. Venting of the variable volume spring chamber 180 upon movement of the diaphragm is accommodated by a vent plug 182 that is formed of elastomeric material and will blow out of the vent plug aperture 184 in the event the chamber 180 is subjected to excessive pressure.

An actuator connection shroud 186 of the same form as described above and shown in FIG. 1 is interconnected in any suitable manner with the lower housing section 144.

It may be desirable to accomplish various rotational positioning of the actuator inlets or position indicating switches regardless of the position of the valve to which the actuator is assembled. This feature is effectively accomplished in the manner illustrated in FIG. 5 wherein a further modified embodiment of this invention is illustrated in fragmentary section. An actuator connection flange 194 similar to that shown particularly at 40 in FIG. 1 is rotatably mounted on bonnet 190 to rest on a support shoulder 192. The bonnet 190 is formed to define a sealant injection and venting passage 196 (similar to passage 36 in FIG. 1) and is further formed to define a peripheral groove 198. The rotatable flange 194 defines a corresponding sealant supply and injection passage 200 that is provided with a fitting 202 at the outer extremity, which fitting may be identical to fitting 42 of FIG. 1. The bonnet 190 is sealed with respect to the outer periphery of the rotatable flange 194 by means of upper and lower sealing elements 204 and 206, which may be elastomer O-rings or any other suitable sealing devices. The rotatable flange 194 is secured in assembly with the bonnet 190 by means of a retainer ring 208 that is received within an appropriate groove formed in bonnet 190.

It is therefore apparent that the present invention is one well adapted to attain all of the objects and advantages hereinabove set forth together with other advantages which will become obvious and inherent from a description of the method and apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. A bonnet and actuator assembly for use with a valve adapted for use in a line including a valve body and a valve member, the assembly being adapted to be connected to the valve body by bolts, comprising:
   a bonnet having a first outturned flange with bolt holes therein adapted to receive said bolts to bolt the bonnet to the valve body;
   an actuator housing;
   an actuator stem within said housing and adapted to be connected with said valve member in said valve body;

stem actuator means in said housing and connected to said stem for moving the stem;

a substantially imperforate shroud connected to said actuator housing and extending downwardly therefrom into engagement with said outturned flange outwardly of said bolt holes so as to protect said bolts connecting the bonnet with the valve body, when assembled thereon, from direct contact by heat from external fires and retarding heat induced deterioration of said bolts holding the bonnet to the valve body and, a plurality of fastener bolts having heads which are accessible externally of said shroud for releasably connecting said shroud to said bonnet, whereby said bolts can be removed without disconnecting said bonnet from said valve body.

2. The assembly of claim 1, including a second outturned flange on the bonnet above the first flange adapted to receive said fastener bolts and to provide a chamber therebetween to receive the heads or nuts of the bolts when the bonnet is bolted to the valve body.

3. The assembly of claim 2 wherein said chamber contains a heat insulating material for further retarding the application of heat to the bolts.

4. The assembly of claim 2 wherein the second outturned flange is integral with said bonnet.

5. The assembly of claim 2 wherein the second outturned flange is rotatably mounted on said bonnet so that the actuator can be angularly oriented in different positions.

6. The assembly of claim 1 wherein said stem actuator means includes a spring disposed within said shroud and connected to said actuator stem to urge the latter in one direction; a stop for limiting movement of the actuator stem in said one direction; said stem actuator means including a motor for moving the actuator stem in the opposite direction and having a releasable connection with the actuator stem permitting the motor, actuator housing and shroud to be moved upwardly as a unit and removed from the bonnet while the actuator stem and spring remain in or on the bonnet whereby inspection or repair to the motor or actuator housing can be made without bleeding down the line in which the valve body is installed.

7. The assembly of claim 6 wherein the connection of the spring to the stem includes a bearing permitting the spring to wind and unwind during movement of the actuator stem without exerting substantial torque on the actuator stem.

8. The assembly of claim 7 wherein the connection between the motor and actuator stem likewise includes a bearing permitting the stem to be rotated without exerting substantial torque on the motor.

9. The assembly of claim 6 wherein said stop is provided by a seat in the bonnet and a seat carried by the actuator stem for engagement with the bonnet seat to form a seal therewith upon predetermined outward movement of the actuator stem.

10. A bonnet and actuator assembly for use with a valve which includes a valve body and a valve member, comprising:

a bonnet adapted to be connected to a valve body;

an actuator housing:

an actuator stem within said actuator housing and adapted to be connected with said valve member in said valve body;

stem actuator means in said housing:

means releasably connecting the stem actuator means with the actuator stem so that when the stem actuator means is released, it is slidable outwardly along said stem;

said actuator housing having a sliding connection with the actuator stem;

resilient means connected between the actuator stem and the bonnet urging the actuator stem outwardly of the actuator housing;

stop means carried by the actuator stem and bonnet and limiting movement of the actuator stem outwardly of the actuator housing; and means releasably connecting the actuator housing to the bonnet which, when released, permits the actuator housing and stem actuator means to be removed from the bonnet while the stop means limits outward movement of the actuator stem under the influence of said biasing means.

11. The assembly of claim 10 wherein the resilient means is a compression spring and its connection to the actuator stem includes a bearing permitting the spring to wind and unwind during movement of the actuator stem without exerting substantial torque on the actuator stem.

12. The assembly of claim 11 wherein the connection between the stem actuator means and the actuator stem like-wise includes a bearing permitting the stem to be rotated without exerting substantial torque on the stem actuator means.

* * * * *